United States Patent [19]
Heck

[11] Patent Number: 5,522,684
[45] Date of Patent: Jun. 4, 1996

[54] CHAMFER CUTTING TOOL

[76] Inventor: Philip Heck, P.O. Box 425, 1480 Old U.S. 23 South, Hartland, Mich. 48353

[21] Appl. No.: 321,173

[22] Filed: Oct. 11, 1994

Related U.S. Application Data

[63] Continuation-in-part of Ser. No. 240,562, May 11, 1994, Pat. No. 5,423,642.

[51] Int. Cl.⁶ .................. B23C 1/20; B27C 5/10
[52] U.S. Cl. ............. 409/138; 144/154.5; 409/178; 451/241
[58] Field of Search ............... 409/138, 136, 409/179, 180, 182, 175; 451/241; 144/225, 134 D

[56] References Cited

U.S. PATENT DOCUMENTS

| | | | |
|---|---|---|---|
| 2,304,405 | 12/1942 | Green | 409/179 |
| 3,131,599 | 5/1964 | MacFarlane et al. | 409/180 |
| 4,279,554 | 7/1981 | Seidenfaden | 409/180 |
| 4,288,187 | 9/1981 | Wanner et al. | 409/180 |
| 4,881,857 | 11/1989 | Tanaka et al. | 409/138 |
| 4,948,307 | 8/1990 | Podds | 409/136 |
| 5,022,160 | 6/1991 | Sharpe et al. | 144/225 X |
| 5,176,478 | 1/1993 | Munch | 409/139 |
| 5,543,910 | 9/1994 | Reines | 409/182 X |

FOREIGN PATENT DOCUMENTS 3004221  8/1981  Germany ................. 409/180

*Primary Examiner*—William Briggs
*Attorney, Agent, or Firm*—Charles W. Chandler

[57] ABSTRACT

A portable tool for milling a chamfer edge on a workpiece includes a milling tool mounted on a motorized drive unit. A hood is carried on the drive unit and partially houses the milling tool. The hood has a bottom opening adjacent the path of the milling tool. A V-shaped guide structure is mounted adjacent the hood opening and includes a pair of guide plates spaced to provide an opening for supporting the edge of the workpiece that is to be cut adjacent the cutting path of the milling tool. An internally mounted bracket in the hood supports the guide plates.

10 Claims, 3 Drawing Sheets

CHAMFER CUTTING TOOL

CROSS-REFERENCE TO RELATED APPLICATIONS

This application is a continuation-in-part of application Ser. No. 08/240,562, filed May 11, 1994, U.S. Pat. No. 5,433,642, for CHAMFER CUTTING TOOL.

BACKGROUND OF THE INVENTION

In my aforementioned pending application, I disclosed an improved two-handed, portable milling tool for chamfering the edge of a workpiece. The milling tool is supported on a motor shaft in a cantilever manner. I have found that the tool is more rugged if the outer end of the shaft, beyond the milling tool, is supported in a bearing in the hood that houses the milling cutter. However, the hood of my prior application is adjustable with respect to the milling cutter shaft, the shaft could not be mounted in a bearing carried in the hood.

SUMMARY OF THE INVENTION

The broad purpose of the present invention is to provide an improved portable two handed chamfering tool in which the hood is fixed with respect to the milling tool. The milling tool shaft is supported in a bearing carried in the hood side wall.

The tool slides along a pair of guide plates that engage the intersecting sides of the workpiece. The guide plates are adjustable with respect to the hood. An internal bracket is mounted in the hood and has a pair of legs on opposite sides of the milling tool. The mid-section of the bracket is connected by an adjustment screw to the top of the hood. By rotating the adjustment screw, the bracket can be raised and lowered with the hood. The lower ends of the bracket legs are mounted in a pair of slots in the end walls of the hood. A pair of locking screws connect the legs to the hood in an adjusted position. The guide plates are in turn carried on the lower ends of the two bracket legs. The guide plates are spaced to form an opening between them. The milling tool cuts the edge of the workpiece in the opening. The guide plates are adjusted either toward or away from the cutting path of the cutting tool depending upon the depth of the cut desired.

Still further objects and advantages of the invention, will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
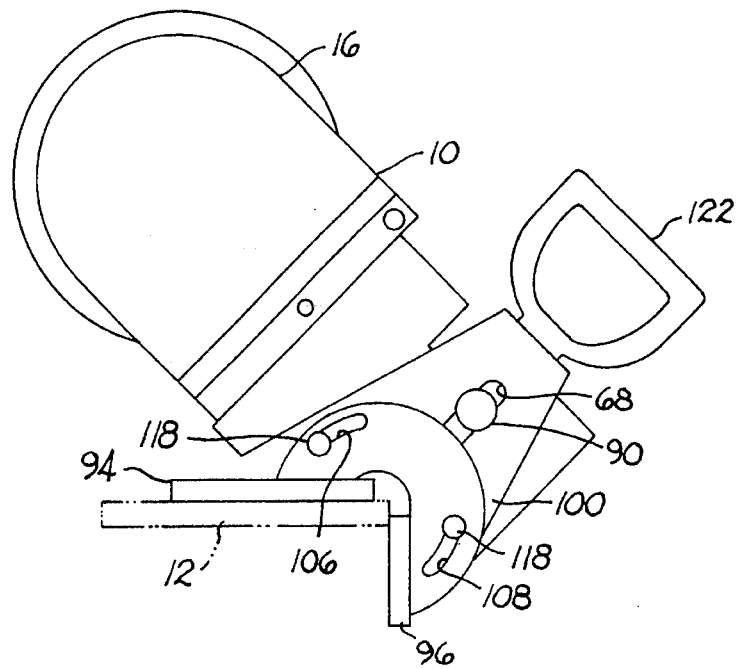
FIG. 1 illustrates an end view of a portable tool illustrating the preferred embodiment of the invention.
Figure 2:
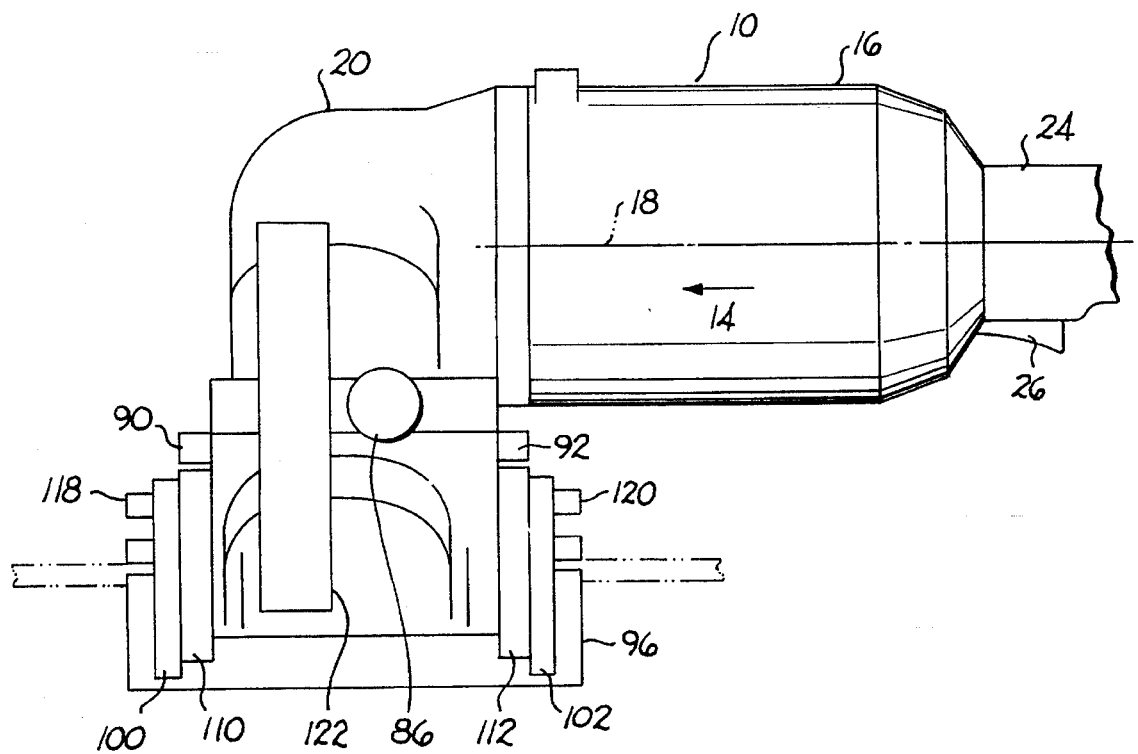
FIG. 2 is a front elevational view of the preferred tool.
Figure 3:
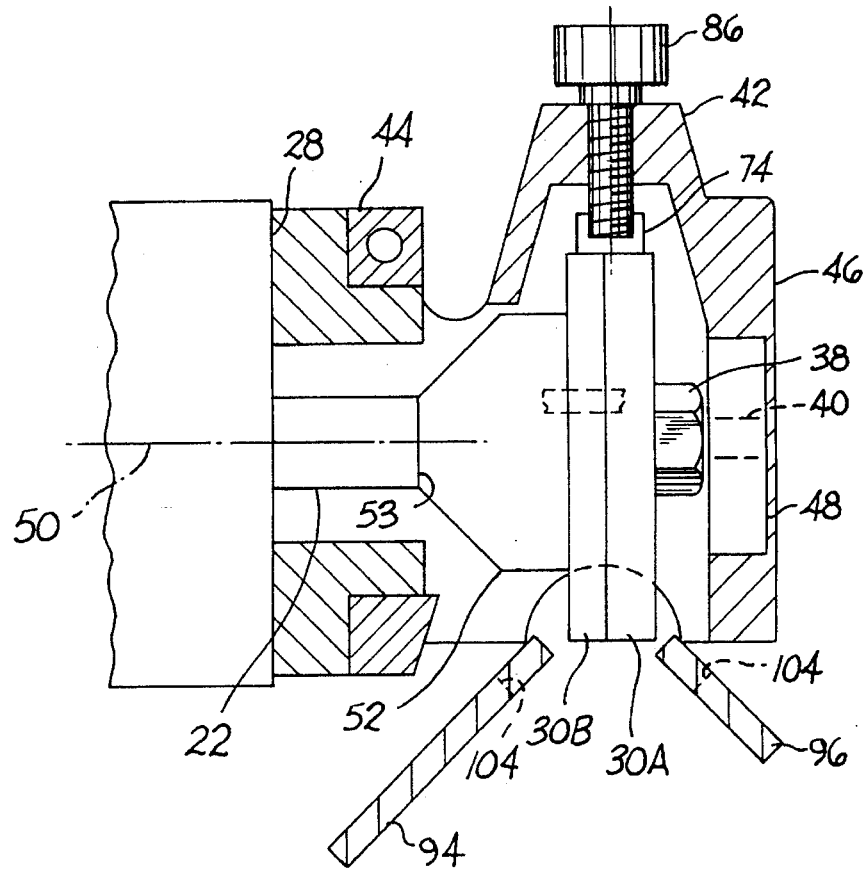
FIG. 3 is an enlarged sectional view of the internal chamber of the hood to show the relationship of the milling tool with respect to the guide plates.

FIGS. 1 and 2 illustrate a portable tool 10 for milling a chamfered edge on a workpiece 12. Numeral 14 in FIG. 2 indicates the direction of tool movement along the workpiece for machining the chamfered edge. The tool has an electric motor 16 having a rotational axis 18 and a right angle drive unit 20 attached to the left end of the motor for changing the drive direction, that is, from horizontal downwardly at a 45° angle to the vertical edge illustrated in FIG. 1. The drive unit could also be a standard straight drive unit. The motor drive unit includes an output shaft means 22 as illustrated in FIG. 3. The motor is a variable speed motor having a rating of at least 2 horsepower. The motor can be either a standard fixed speed motor such as a washing machine motor/swimming pool motor or a power tool motor such as a grinder polisher motor as we used. Speed can be fixed or variable. The rpm should range between 1500 and 6000 depending on the material being cut and depth of cut. The motor is equipped with a manual speed control for varying the motor speed and hence the speed of output shaft 22. The motor could also be a single speed motor.

An elongated handle 24 extends from the right end of motor 16, approximately on the motor centerline, as fragmentarily shown in FIG. 2. A manual trigger 26 is carried on the handle for turning the motor on or off. The user usually curls the fingers of one hand around the handle, with his index finger aligned with trigger 26. Finger pressure on the trigger turns the motor on. Releasing the trigger turns the motor off.

Figure 4:
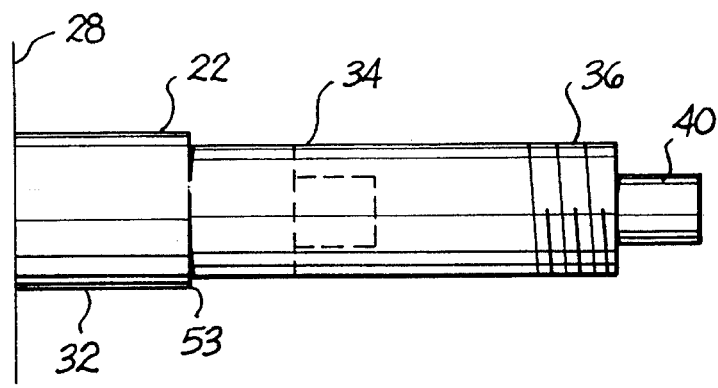
FIG. 4 is a view of the extension for the motor shaft.

As shown in FIGS. 3 and 4, output shaft means 22 extends to the right, beyond face 28 of the drive unit to support a milling cutter means 30.

The milling cutter means comprises stacked, identical milling cutters 30A and 30B, as illustrated in FIG. 3. The two cutters are identical but rotated so that the cutter inserts on one disc are spaced from the cutting inserts on the neighboring disc. One cutter can be used for a lighter beveling.

The output shaft includes the standard motor shaft 32, as illustrated in FIG. 4, a shaft extension 34 having a threaded section 36 for receiving a lock nut 38, and a reduced outer end 40.

A cast metal hood 42 is carried on the drive unit by fastener means 44. The hood has a side wall 46 supporting a bearing 48 that is aligned with the axis of rotation 50 of the milling cutter. The reduced outer end 40 of the shaft means is supported in the bearing for rotation. The milling cutter is mounted on shaft extension 34 and locked in position between lock nut 38 and a spacer 52. The spacer abuts an annular shoulder 53 on shaft 32.

Figure 5:
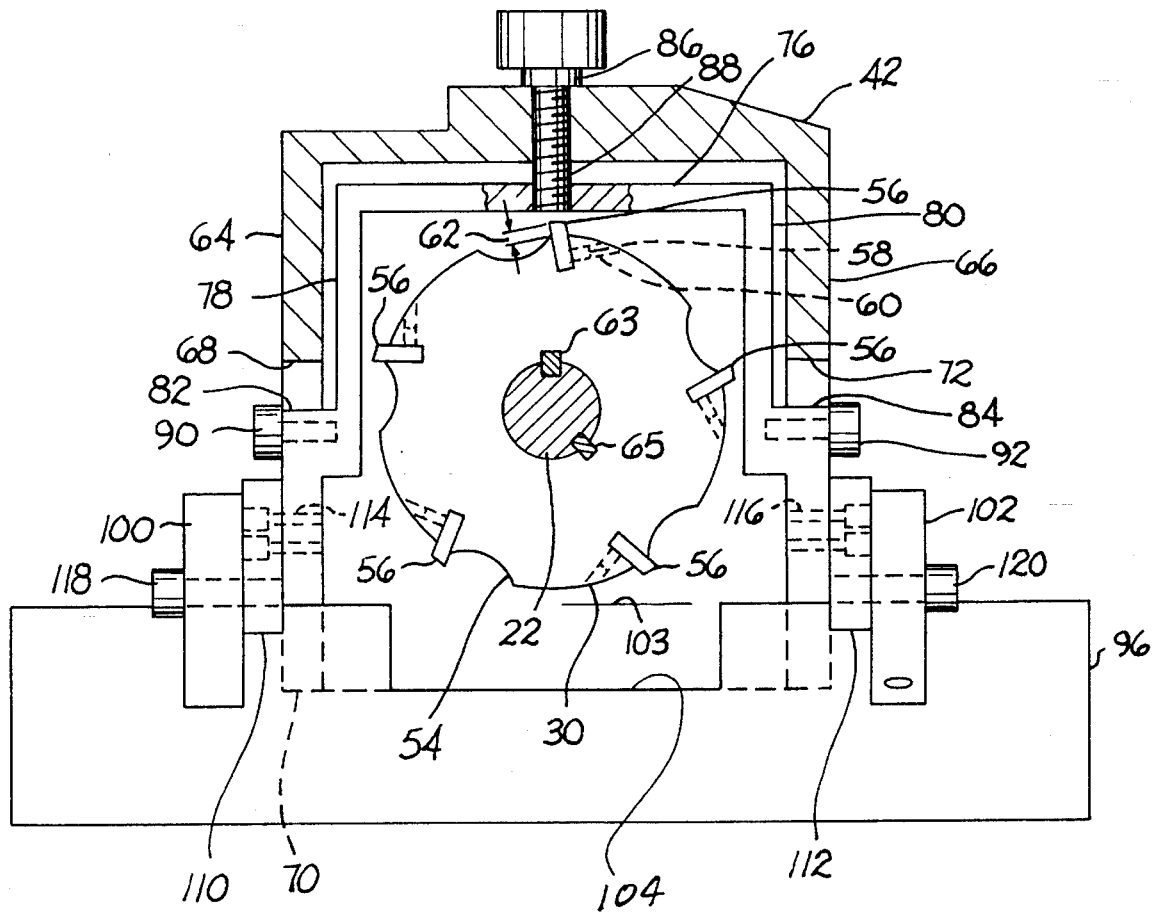
FIG. 5 is a fragmentary sectional view generally as seen at right angles to the FIG. 3 view.

As illustrated in FIGS. 3 and 5, each milling cutter assembly comprises a circular disc 54 slotted at five equally spaced peripheral positions to support replaceable cutting inserts 56.

Each cutting insert is held in its' respective slot by a set screw 58 in a threaded opening 60. Each set screw is adjustable in a direction normal to its' respective cutting insert. The diameter of each disc is at least twice the diameter of shaft 22. Typically the shaft diameter may be about 1" whereas the disc diameter may be about 2½". Each cutting insert projects from the peripheral edge of the disc by a projection distance 62 which is typically about 0.1". The cutter insert has a chip load of about 0.1". A single pass of the tool along the workpiece provides a cut of about 0.580".

A cutting tip insert may have either a straight cutting tip for milling a flat chamfer surface or a concave tip for milling a rounded chamfer surface.

A pair of keys 63 and 65 are located in slots in the shaft for preventing rotation of the cutter assembly with respect to the shaft.

Referring to FIGS. 3 and 5, hood 42 encloses the milling cutter to contain any chips developed by the cutting process and to provide a safety housing for the rotating tool. The hood has a pair of spaced parallel end walls 64 and 66 disposed on opposite sides of the milling tool and generally parallel to the axis of rotation of the milling tool. End wall 64 has a vertical slot 68 that extends from the bottom edge 70 of the hood. End wall 66 also has a similar slot 72 that is aligned with slot 68 and is parallel to slot 68.

An internal generally U-shaped mounting bracket 74 is disposed inside the hood and has a mid-section 76 adjacent the top wall of the hood. The bracket has a pair of legs 78 and 80. Legs 78 and 80 are parallel to one another and disposed on opposite sides of the milling tool. The upper ends of legs 78 and 80 are spaced a distance less than the internal distance between end walls 64 and 66. The lower ends of the legs are offset at 82 and 84, respectively, so that the lower ends of the legs are slideably received in slots 68 and 72. The lower offset ends of the legs are shorter than the length of slots 68 and 72 so that they can be adjusted up and down in the hood as illustrated in FIG. 5 slots 68 and 72 constitute linear guides for slideably supporting the bracket legs 78 and 80.

An adjustment screw 86 is mounted at the top of the hood above the milling cutters, and threadably engaged with the mid-section of the bracket at 88. Rotating the adjustment screw in one direction raises the bracket; rotating the adjustment screw in the opposite direction lowers the bracket. A pair of locking screws 90 and 92 are threadably engaged in the offset portion of legs 78 and 80 as illustrated in FIG. 5. The heads of the two locking screws are larger than their respective slots so that by tightening up on the locking screws, the bracket legs can be locked in position with respect to the hood.

A guide means is attached to the hood for sliding engagement with workpiece 12 so that the milling cutters maintain contact with the workpiece edge as the tool is being moved along the workpiece. Referring to FIGS. 3 and 5, the guide means comprises a pair of guide plates 94 and 96. The two guide plates are attached to a pair of curved planar guide members 100 and 102 at a 90° angle with respect to one another. Each guide plate has a cut-out opening 104 as illustrated in FIGS. 3 and 5. Planar guide members 100 and 102 serve as mounting mechanisms for adjustably mounting guide plates 94 and 96.

Each of the curved guide members has a pair of curved planar slots 106 and 108. The slots are illustrated in FIG. 1 on guide member 100. Guide member 102 has an identical pair of slots. The slots permit rotation of the two guide plates 94 and 96 about an axis 103 (FIG. 5) to adjust the angle of the beveled cut on the workpiece.

Referring to FIG. 5, a pair of adjustment plates 110 and 112 are mounted between curved guide plates 100 and 102 and the walls of the hood. Plates 110 and 112 are fastened to the lower ends of bracket legs 78 and 80, respectively, by recessed threaded fastener means 114 and 116. Plates 110 and 112 are carried with the bracket as its location is being adjusted by screw 86. Curved planar guide members 100 and 102 are in turn connected by socket head threaded fastener means 118 and 120 to plates 110 and 112. Fastener means 118 and 120 are tightened after guide plates 94 and 96 have been adjusted to accommodate the cutting angle of the milling tool with respect to the workpiece.

The depth of the cut is adjusted by loosening locking screws 90 and 92 and adjusting adjustment screw 86. Adjustment screw 86 moves the opening 104 between the two guide plates toward and away from the milling tool which in turn adjusts the height of the milling tool with respect to the edge of the workpiece. Locking screws 90 and 92 are then tightened to lock the guide plates in position.

A handle 122 is mounted on top of the hood and the milling cutter to assist the user in manually holding the tool.

Having described my invention, I claim:

1. A portable tool for milling a chamfer on an edge of a workpiece, comprising:

an electric motor having a drive axis and a first handle (24) extending from said motor;

a drive unit (20) connected to said motor, said drive unit having a rotatable output shaft (22);

a milling cutter mounted on said output shaft for rotation around the shaft axis in a plane transverse to the shaft axis;

a hood (42) affixed to said drive unit so as to partially encircle said milling cutter, and a second handle (122) extending from said hood;

said first and second handles being adapted for a person's hands to grip to move the tool along a workpiece in a direction substantially parallel to the motor drive axis;

said hood having two spaced end walls (64, 66), in the rotational plane of the milling cutters; each of said hood end walls having a linear guide means therein extending transverse to the milling cutter rotational axis and parallel to the milling cutter rotational plane;

a unitary mounting bracket (74) in said hood, said bracket having two parallel legs (78, 80) slidable in said linear guide means, whereby said bracket can be adjusted in a direction transverse to the milling cutter rotational axis; and two angularly related guide plates (94, 96) having spaced mounting mechanisms attached to the legs of said mounting brackets; said guide plates extending parallel to the movement direction of the tool, whereby said guide plates are enabled to ride along angularly related surfaces of the workpiece while the milling cutter is forming a chamfer on an edge of the workpiece.

2. A tool as defined in claim 1, wherein said unitary mounting bracket comprises a connector wall (76) joining said legs, whereby the bracket has a U-shaped configuration; and a single adjustment screw trained between said hood and said connector wall for moving the bracket in a direction transverse to the milling cutter rotational axis.

3. A tool as defined in claim 2, wherein each of said linear guide means comprises a linear slot in the respective hood end wall, each of said respective brackets being slidably supported in the respective linear slot.

4. A tool as defined in claim 2, and further comprising a locking screw (90, 92) carried by each of said bracket legs, each of said legs having an enlarged head adapted to exert a clamping force on the associated hood end wall to lock the bracket in selected adjusted positions.

5. A tool as defined in claim 1, wherein each of said mounting mechanisms comprises a planar guide member (100 or 102) attached to said guide plates, and threaded fastener members (118, 120) extending through each of said planar guide members to mount the guide plates on said bracket; each of said planar guide members having two curved slots (106, 108) accommodating said threaded fastener members, whereby said guide plates can be adjusted around an axis defined by the curved slots.

6. A portable tool for milling a chamfer on an edge of a workpiece, comprising:

an electric motor having a drive axis and a first handle (24) extending from said motor;

a drive unit (20) connected to said motor, said drive unit having a rotatable output shaft (22);

a milling cutter mounted on said output shaft for rotation around the shaft axis in a plane transverse to the shaft axis;

a hood (42) affixed to said drive unit so as to partially encircle said milling cutter, and a second handle (122) extending from said hood;

said first and second handles being adapted for a person's hands to grip to move the tool along a workpiece in a direction substantially parallel to the motor drive axis;

said hood having a side wall (46) extending generally transverse to the axis of said shaft, and a shaft-support bearing (48) in said hood side walls, said shaft extending from said drive unit through the milling cutter into said support bearing, whereby the shaft is supported jointly by the drive unit and the support bearing;

said hood having two spaced end walls (64, 66) in the rotational plane of the milling cutters; each of said hood end walls having a linear guide means therein extending transverse to the milling cutter rotational axis and parallel to the milling cutter rotational plane;

a unitary mounting bracket (74) in said hood, said bracket having two parallel legs (78, 80) slidable in said linear guide means, whereby said bracket can be adjusted in a direction transverse to the milling cutter rotational axis;

two angularly related guide plates (94, 96) having spaced mounting mechanisms attached to the legs of said mounting brackets, said guide plates extending parallel to the movement direction of the tool, whereby said guide plates are enabled to ride along angularly related surfaces of the workpiece while the milling cutter is forming a chamfer on an edge of the workpiece.

7. A tool as defined in claim 6, wherein said unitary mounting bracket comprises a connector wall (76) joining said legs, whereby the bracket has a U-shaped configuration, and a single adjustment screw trained between said hood and said connector wall for moving the bracket in a direction transverse to the milling cutter rotational axis.

8. A tool as defined in claim 7, wherein each of said linear guide means comprises a linear slot in the respective hood end wall, each of said respective brackets being slidably supported in the respective linear slot.

9. A tool as defined in claim 6, and further comprising a locking screw (90, 92) carried by each of said bracket legs, each of said legs having an enlarged head adapted to exert a clamping force on the associated hood end wall to lock the bracket in selected positions of adjustment.

10. A tool as defined in claim 6, wherein each of said mounting mechanisms comprises a planar guide member (100 or 102) attached to said guide plates, and threaded fastener members (118, 120) extending through each of said planar guide members to mount the guide plates on said bracket, each of said planar guide members having two curved slots (106, 108) accommodating said threaded fastener members, whereby said guide plates can be adjusted around an axis defined by the curved slots.

* * * * *